United States Patent
Batzler

(10) Patent No.: US 10,369,651 B2
(45) Date of Patent: Aug. 6, 2019

(54) METHOD AND APPARATUS FOR PROVIDING WELDING-TYPE POWER AND AUXILIARY POWER

(71) Applicant: Todd Gerald Batzler, Hortonville, WI (US)

(72) Inventor: Todd Gerald Batzler, Hortonville, WI (US)

(73) Assignee: Illinois Tool Works Inc., Glenview, IL (US)

( * ) Notice: Subject to any disclaimer, the term of this patent is extended or adjusted under 35 U.S.C. 154(b) by 1266 days.

(21) Appl. No.: 13/843,583

(22) Filed: Mar. 15, 2013

(65) Prior Publication Data

US 2014/0263235 A1 Sep. 18, 2014

(51) Int. Cl.
*B23K 9/10* (2006.01)

(52) U.S. Cl.
CPC .......... *B23K 9/1075* (2013.01); *B23K 9/1043* (2013.01)

(58) Field of Classification Search
CPC ... B23K 9/1012; B23K 9/1043; B23K 9/1075
USPC ...... 219/130.1, 133, 134; 361/142, 600–601, 361/611, 614
See application file for complete search history.

(56) References Cited

U.S. PATENT DOCUMENTS

| | | | |
|---|---|---|---|
| 6,130,398 A * | 10/2000 | Schneider | B23K 10/006 219/121.39 |
| 2005/0237724 A1* | 10/2005 | Fiorentino | H05K 7/1457 361/752 |
| 2007/0181547 A1 | 8/2007 | Vogel | |
| 2007/0253149 A1* | 11/2007 | Mohn | A47C 31/008 361/600 |
| 2010/0193489 A1 | 8/2010 | Beeson et al. | |
| 2010/0320183 A1 | 12/2010 | Borchert et al. | |
| 2011/0043986 A1* | 2/2011 | Conn | H05K 7/1492 361/679.02 |
| 2011/0049115 A1 | 3/2011 | Luo | |
| 2011/0174791 A1* | 7/2011 | Stanzel | B23K 9/1006 219/133 |

OTHER PUBLICATIONS

PCT International Search Report and Written Opinion, dated Jul. 22, 2014, European Patent Office, Rijswijk, Netherlands.
Office Action, dated Mar. 17, 2017, Canadian Intellectual Property Office, K2P 1P9 Ottawa Ontario Canada.
Office Communication, European Patent Office, dated Dec. 15, 2017, 80298 Munich Germany.

* cited by examiner

*Primary Examiner* — Dana Ross
*Assistant Examiner* — James F Sims, III
(74) *Attorney, Agent, or Firm* — George R. Corrigan

(57) ABSTRACT

A method and apparatus for providing a welding-type power includes a housing with an auxiliary power mount, and a welding type power circuit. A controller, a control power circuit, and an auxiliary power module are disposed in the housing. The auxiliary power module/circuit is mounted to the auxiliary power mount. A standard power receptacle is connected to the auxiliary power module. At least one wiring harness connects the welding type power circuit to the auxiliary power module/circuit, which is the only electrical connection between the auxiliary power circuit and the welding type power circuit. The auxiliary power is electrically isolated from the input power and the welding type power.

15 Claims, 2 Drawing Sheets

METHOD AND APPARATUS FOR PROVIDING WELDING-TYPE POWER AND AUXILIARY POWER

FIELD OF THE INVENTION

The present disclosure relates generally to the art of welding-type power supplies. More specifically, it relates to welding-type power supplies that provide auxiliary power.

BACKGROUND OF THE INVENTION

There are many known types of welding-type power supplies that provide welding type power. Welding type power, as used herein, refers to power suitable for electric arc welding, plasma arc cutting or induction heating. Welding-type power supply, as used herein, refers to a power supply that can provide welding type power. Welding type systems are used to perform a variety of processes and are used in a variety of settings. Welding-type system, as used herein, is a system that can provide welding type power, and can include control and power circuitry, wire feeders, and ancillary equipment.

Some welding type systems include auxiliary power supplies for power tools, lights etc. Auxiliary power, as used herein, refers to power that may be used in place of utility power, such as 120 vac. Such auxiliary power supplies typically include a simplex or duplex outlet/receptacle.

Additionally, welding-type systems typically include control power supplies, for providing control power to the system controller or controllers, and power supplies for system components such as wire feeders, coolers, etc. Not all welding-type systems require the same power supplies. For example, some welding-type systems might not require auxiliary power.

Auxiliary power supplies need to be able to supply the desired power for the auxiliary uses such as tools or lights. Other power supplies within a welding-type system must be able to supply the power needed for their purpose—such as powering a cooler, providing control power, etc. Each of these power supplies must be designed to operate in the environment of and with the input power of the welding-type system. Additionally, power supplies within a welding-type system are designed to provide the necessary isolation or safety features, given the various uses of the power supplies within a welding-type system.

Some system components, such as coolers, are often designed to operate using utility power, such as 120 vac. However, 120 vac is not always available where a welding-type system is being used. Accordingly, an auxiliary power supply of a welding-type system having sufficient power for powering a cooler is desirable. Moreover, on occasion the owner of a welding-type system that initially did not need auxiliary power might eventually need auxiliary power. Thus, a welding-type system that allows users to field install auxiliary power is desirable.

SUMMARY OF THE PRESENT INVENTION

According to a first aspect of the disclosure a welding-type power supply includes a housing with an auxiliary power mount, and a welding type power circuit. a controller, a control power circuit, and an auxiliary power module disposed in the housing. The auxiliary power module/circuit is mounted to the auxiliary power mount. A standard power receptacle is connected to the auxiliary power module. At least one wiring harness connects the welding type power circuit to the auxiliary power module/circuit, which is the only electrical connection between the auxiliary power circuit and the welding type power circuit.

According to a second aspect of the disclosure welding-type and auxiliary power is provided by receiving input power, converting the input power to welding type power and providing the welding type power as an output. Also, control power and auxiliary power are provided. The auxiliary power is electrically isolated from the input power and the welding type power.

The standard power receptacle is a simplex or a duplex outlet, and may be connected to the auxiliary power circuit using a second wiring harness in various alternatives.

The at least one wiring harness is two wiring harnesses and/or is removable in various embodiments.

The auxiliary power module is disposed to be field installed in another embodiment.

The standard power receptacle is electrically isolated from the input power and the welding type power output and/or the control power circuit in various embodiments.

Other principal features and advantages of will become apparent to those skilled in the art upon review of the following drawings, the detailed description and the appended claims.

Figure 1:
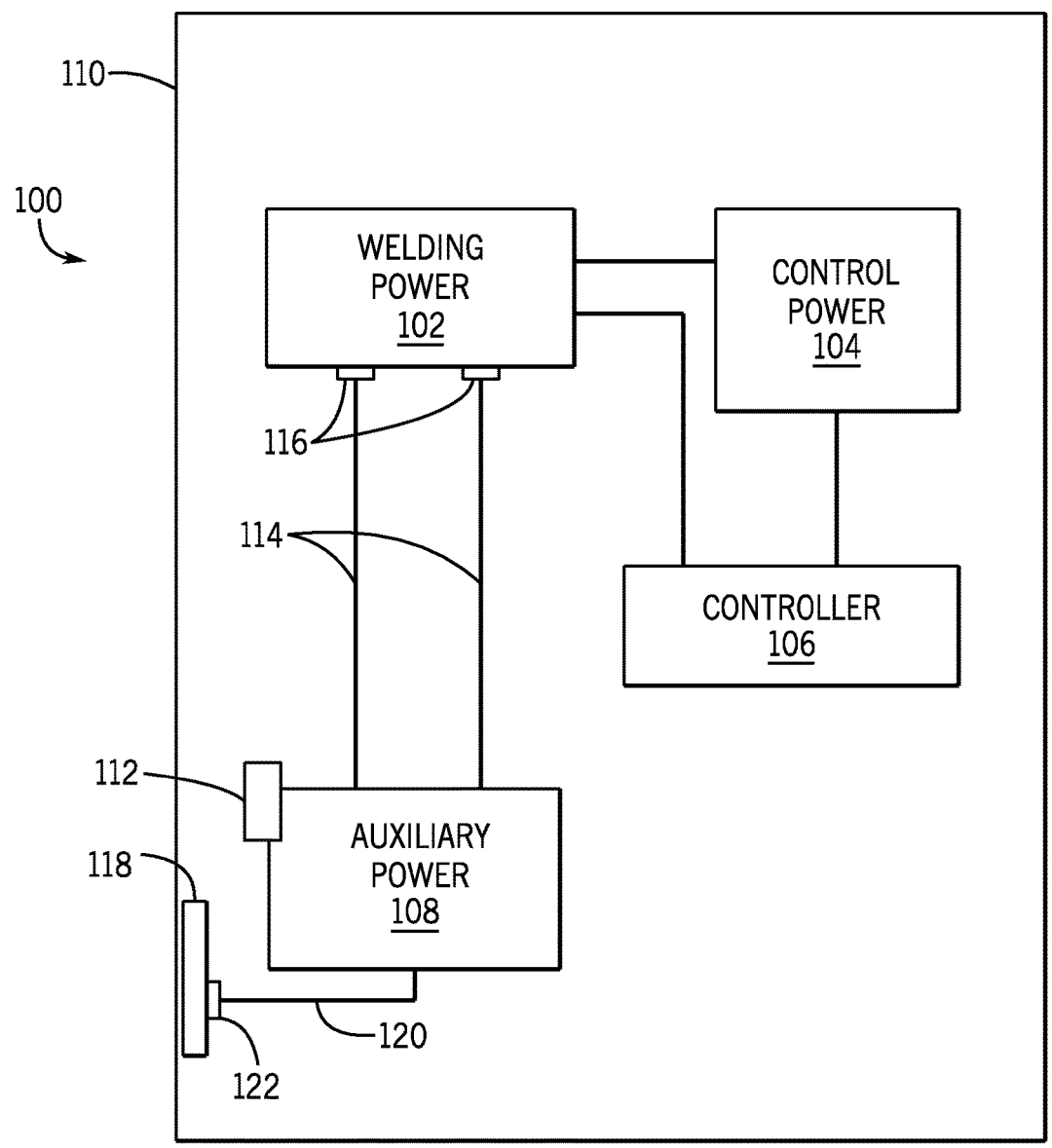
FIG. 1 is a diagram of a welding system.

Before explaining at least one embodiment in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present disclosure will be illustrated with reference to a particular welding-type system using particular components, it should be understood at the outset other welding-type systems with other components can be used.

Generally, the welding-type system and method described herein is implemented with a welding-type power supply that includes a welding type power circuit that provides welding type power, a control power circuit that provides control power and auxiliary power circuit that provides auxiliary power. Welding type power circuit, as used herein, refers to power circuitry that receives an input power and provides welding type power. Control power circuit, as used herein, refers to power circuitry that receives an input power and provides control power, such as 20V, 40V, 50V, or 60V dc or ac, e.g. Auxiliary power circuit, as used herein, refers to power circuitry that receives an input power and provides auxiliary power.

The auxiliary power is provided by an auxiliary power module that is readily field installed. The preferred embodiment provides that the module has only several connections, preferably one wire harness to a simplex or duplex standard power receptacle, and one or two wire harnesses to the welding type power circuit. The wire harness are preferably removable. Also, the output of the auxiliary power module is isolated from the welding type power circuit, as well as from the control power circuit. Auxiliary power module as used herein, is software and hardware, including mounts, connections, etc., that cooperates to convert power received to auxiliary power. Field installed, as used herein, refers to installing a module at a job site where a welding-type power supply is to be used, rather than in a repair shop or where the welding-type power supply is manufactured. Removable wiring harness, as used herein, includes a wiring harness that is able to be easily connected, disconnected and reconnected without damaging the connections, and without the use of tools. Standard power receptacle, as used herein, includes a power receptacle, such as a simplex or duplex, commonly used to provide utility power to tools, coolers, etc.

The welding-type system is disposed in a housing, and the housing includes an auxiliary power mount to which the auxiliary power module may be mounted, either in the factory or in the field. The power mount may include the standard receptacle, or the receptacle may be part of the auxiliary power module. Auxiliary power mount, as used herein, includes the fixture or opening in a housing to which an auxiliary power module is mounted. Module, as used herein, is software and/or hardware that cooperates to perform one or more tasks, and can include digital commands, control circuitry, power circuitry, networking hardware, etc.

FIG. 1 shows a diagram of a welding-type system 100 that includes a welding type power circuit 102, a control power circuit 104, a controller 106 and an auxiliary power module 108 disposed in a housing 110. Welding power circuit 102 can be any welding power circuit, and in the preferred embodiment is a welding power supply such as that shown in U.S. Pat. No. 6,987,242 or in Patent Publication 20090230941 (Vogel), both owned by the owner of this patent, and both of which are hereby incorporated by reference. Control power circuit 104 can also be any control power circuit used in a welding-type power supply, and in the preferred embodiment is also one such as that shown in U.S. Pat. No. 6,987,242. The welding power supply of U.S. Pat. No. 6,987,242 is able to receive any input voltage over a range of voltages, and rectifies and boosts that voltage to a desired dc bus. The dc bus is inverted, PWM'ed and transformed to a welding type output power. Control power is also derived from the dc bus. The output circuit may be similar to that shown in U.S. Pat. No. 6,987,242 or it may be designed for one or more a particular welding type processes for which the system is intended to be used.

Controller 106 may be similar to that shown in U.S. Pat. No. 6,987,242, or it may be a controller designed particularly for intended processes. In various embodiments controller 106 is a digital microprocessor based controller, or an analog controller. Controller, as used herein, is the digital and/or analog circuitry and/or logic/instructions that cooperate to provide control signals to one or more circuits. A controller can be located on a single board, or distributed across multiple locations.

Auxiliary power module 108 includes an auxiliary power circuit, and is mounted to housing 110 using an auxiliary power mount 112. Mount 112 is preferably easy to use and the module 108 is installable in the field using no tools or common tools. A pair of wire harnesses 114 are used to connect auxiliary power module 108 to welding type power circuit 102, such as across the bus in power circuit 102. Alternatively, one of the wire harness could connect to auxiliary power module 108 to control power circuit 104 or controller 106, or a single wire harness could be used. Wire harnesses 114 are removably connected to circuit 102, preferably using common removable connectors 116, which is preferably across the bus in power circuit 102.

Auxiliary power module 108 is also connected via a wire harness 120 and a connector 122 to a simplex standard 120 vac receptacle 118. Connector 122 is preferable a removable connector. Receptacle 118 can be a duplex receptacle, and can be any common style, such as types A-M, used throughout the world (see http://electricaloutlet.org/).

Receptacle 118 may be part of auxiliary power module 108, or it may be affixed to housing 110 independent of module 108. When receptacle 118 is part of module 108 it is preferably easy to affix (screws, clamps, etc) to housing 118 to allow for field installation. Also, the auxiliary power circuit in module 108 can be hard wired to receptacle 118 since they would be installed together. When receptacle 118 is not part of module 108, receptacle 118 is preferably factory installed, and connector 122 is preferably a quick connect style connector, to allow for easy field installation of module 108.

Providing a separate auxiliary power module 108 and a control power circuit 104 allows the isolation and insulation of each to be particularly suited for that circuit, rather than designed for a circuit that provides both control power and auxiliary power. Also, any loading affect associated with step-load changes on the auxiliary power module 108 (which is also called a CPS or cooler power supply) such as starting the motor is decoupled from the control power.

Figure 2:
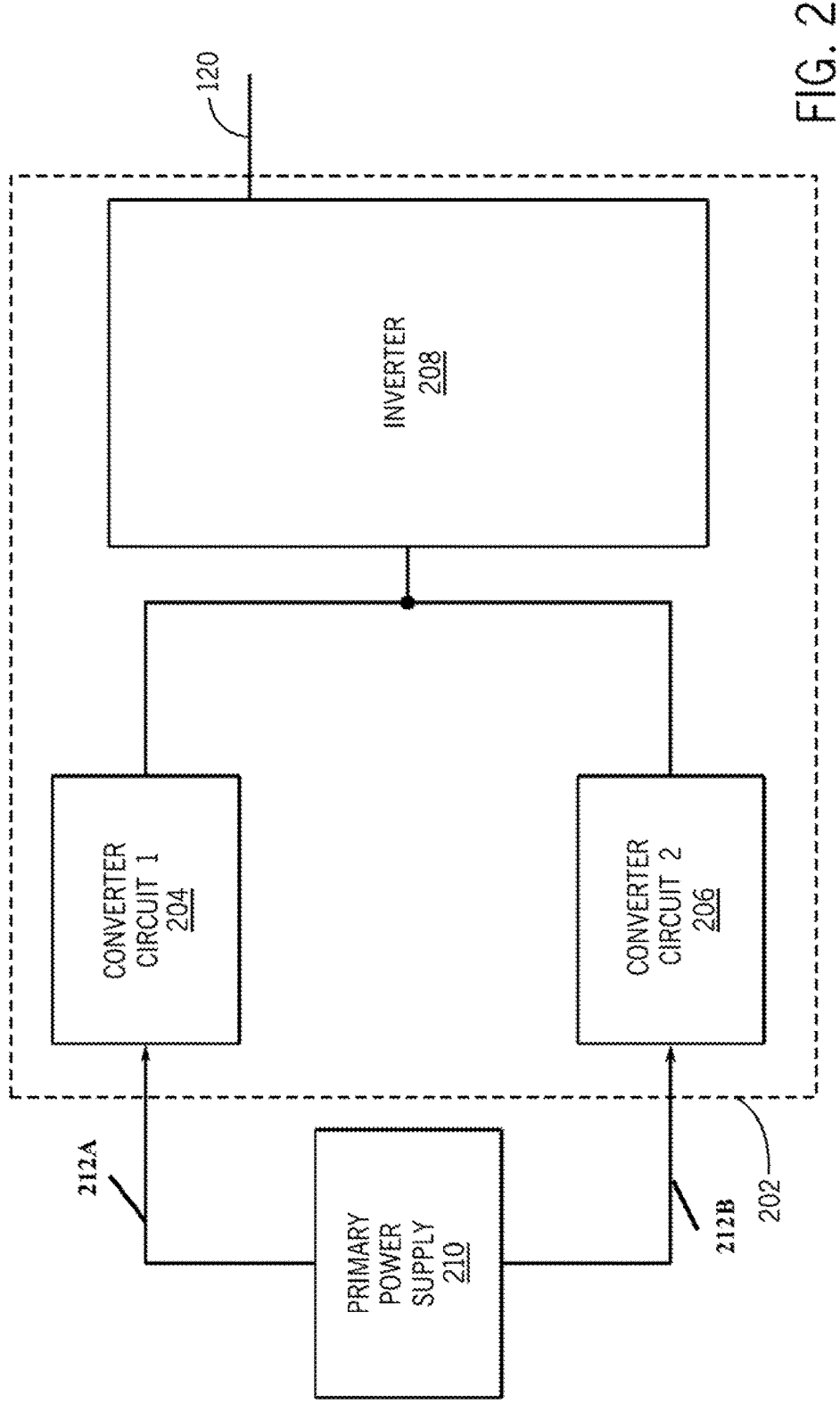
FIG. 2 is a diagram of an auxiliary power module.

A diagram of module 108 is shown in FIG. 2. Module 108 includes an auxiliary power circuit 202. Auxiliary power circuit 202 includes a dual, stacked two-switch forward converters 204 and 206, whose output are combined and provided to an inverter 208. The output of inverter 208 is preferably a 110 vac signal, or other standard utility power, and is provided on wire harness 120 to the simplex or duplex outlet.

Each forward converter is connected to receive the bus (212A and 212B) and preferably runs off one-half of the total bus voltage. A high switching frequency allows a smaller isolation transformer core. The use of dual, stacked two-switch forward converters allows lower rated mosfets to be used. A single high-voltage topology could be used, but would most likely necessitate use of IGBTs thus lowering the converter switching frequency and increasing the subsequent size of the magnetic devices. If cost-effective silicon-carbide mosfets become available, which would combine the high switching speed and high voltage characteristics of both devices into a single semiconductor switch then a single high-voltage topology may be used. Also, the use of dual, stacked two-switch forward converters allows a uni-polar peak primary current detect for simple secondary power limiting with inexpensive current-transformer feedback. Primary-side current limiting is preferably used, which allows CT's to be used to limit the output power (versus a DC sensing hall device). Also, primary-side current limiting allows cycle-by-cycle current limiting of each switching event of the primary-side mosfets. There is no need for a control loop or average current-mode control/controller. Rather, a comparator fed with the CT signal and a peak current reference that terminates the on-time may be used.

Other topologies may be used if desired. For example, the auxiliary power supply of Patent Publication 20100320183 (Borchert et al and also owned by the owner of this patent), may be implemented using the field-installable design described herein. Patent Publication 20100320183 is hereby incorporated by reference.

Numerous modifications may be made to the present disclosure which still fall within the intended scope hereof. Thus, it should be apparent that there has been provided a method and apparatus for providing welding and auxiliary power that fully satisfies the objectives and advantages set forth above. Although the disclosure has been described specific embodiments thereof, it is evident that many alternatives, modifications and variations will be apparent to those skilled in the art. Accordingly, the invention is intended to embrace all such alternatives, modifications and variations that fall within the spirit and broad scope of the appended claims.

The embodiments of the invention in which an exclusive property or privilege is claimed are defined as follows:

1. A welding-type power supply comprising:
   a housing, including an auxiliary power mount;
   a welding type power circuit including a bus, wherein the welding type power circuit is disposed within the housing and receives an input;
   a controller, connected to control the welding type power circuit;
   a control power circuit, connected to provide control power to the controller; and
   an auxiliary power module having an auxiliary power circuit, a standard power receptacle electrically connected to the auxiliary power circuit, and at least one wiring harness disposed to be connected to the bus of the welding type power circuit with a plurality of removable connectors, wherein the auxiliary power circuit is mounted to the auxiliary power mount and the only electrical connection between the auxiliary power circuit and the welding type power circuit is through the at least one wiring harness and the plurality of removable connectors.

2. The welding-type power supply of claim 1, wherein the standard power receptacle is a simplex outlet.

3. The welding-type power supply of claim 1, wherein the standard power receptacle is a duplex outlet.

4. The welding-type power supply of claim 1, wherein the standard power receptacle is connected to the auxiliary power circuit using a second wiring harness and a subset of the plurality of removable connectors.

5. The welding-type power supply of claim 4, wherein the at least one wiring harness is two wiring harnesses.

6. The welding-type power supply of claim 1, wherein the at least one wiring harness is removable.

7. The welding-type power supply of claim 6, wherein the auxiliary power module is disposed to be field installed.

8. The welding-type power supply of claim 1, wherein the standard power receptacle is electrically isolated from the input power and the welding type power output.

9. The welding-type power supply of claim 8, wherein the standard power receptacle is electrically isolated from the control power circuit.

10. A method of providing welding-type and auxiliary power using the welding-type power supply of claim 1, comprising:
    receiving input power;
    converting the input power to welding type power using said welding type power circuit, and providing the welding type power as an output;
    providing control power using said control power circuit;
    providing auxiliary power using said auxiliary power circuit; and
    electrically isolating the auxiliary power from the input power and the welding type power.

11. The method of claim 10, further comprising, connecting said at least one wiring harness to the auxiliary power circuit and to the welding type power circuit, and connecting a second wiring harness to the auxiliary power circuit and to said standard power receptacle.

12. The method of claim 11, wherein connecting the at least one wiring harness to the auxiliary power circuit and to the welding type power circuit includes connecting two wiring harnesses to the auxiliary power circuit and to the welding type power circuit.

13. The method of claim 11, wherein connecting the at least one wiring harness to the auxiliary power circuit and to the welding type power circuit includes connecting a removable wiring harness.

14. The method of claim 11, wherein connecting the at least one wiring harness to the auxiliary power circuit and to the welding type power circuit is performed in the field.

15. The method of claim 10, further comprising electrically isolating the auxiliary power from the auxiliary power.

* * * * *